TYPICAL VARIABLE STRESS WAVEFORM

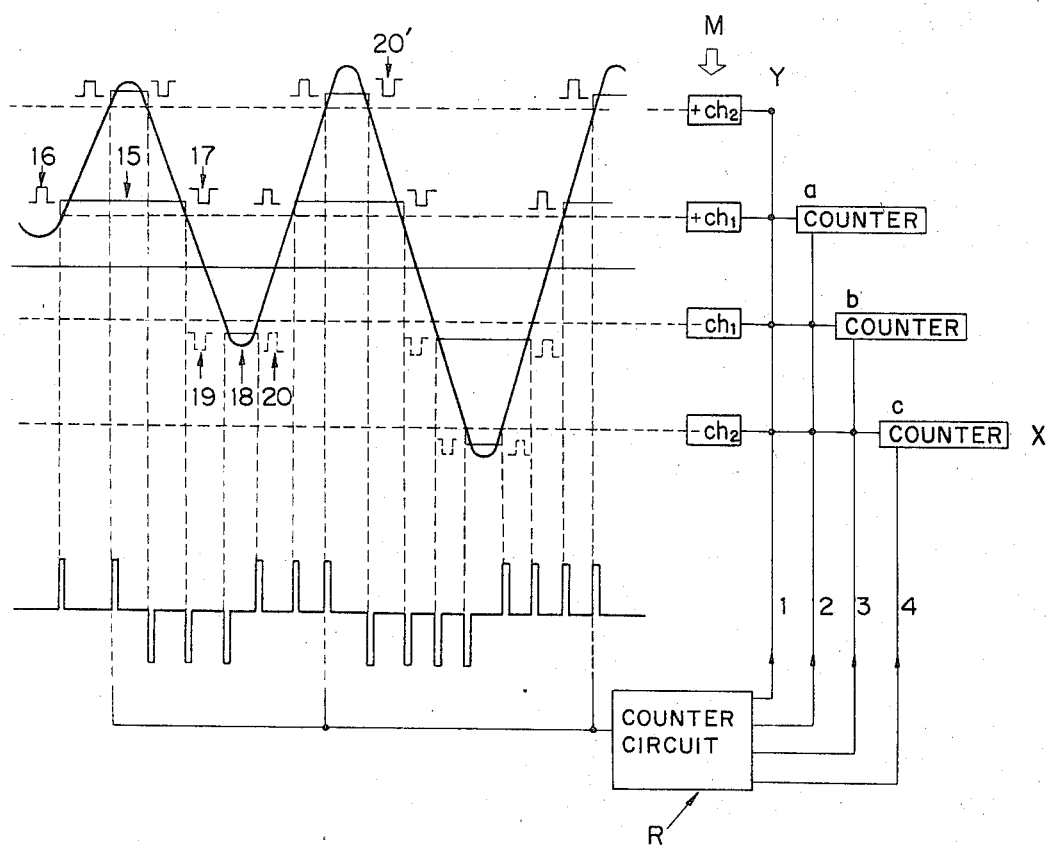

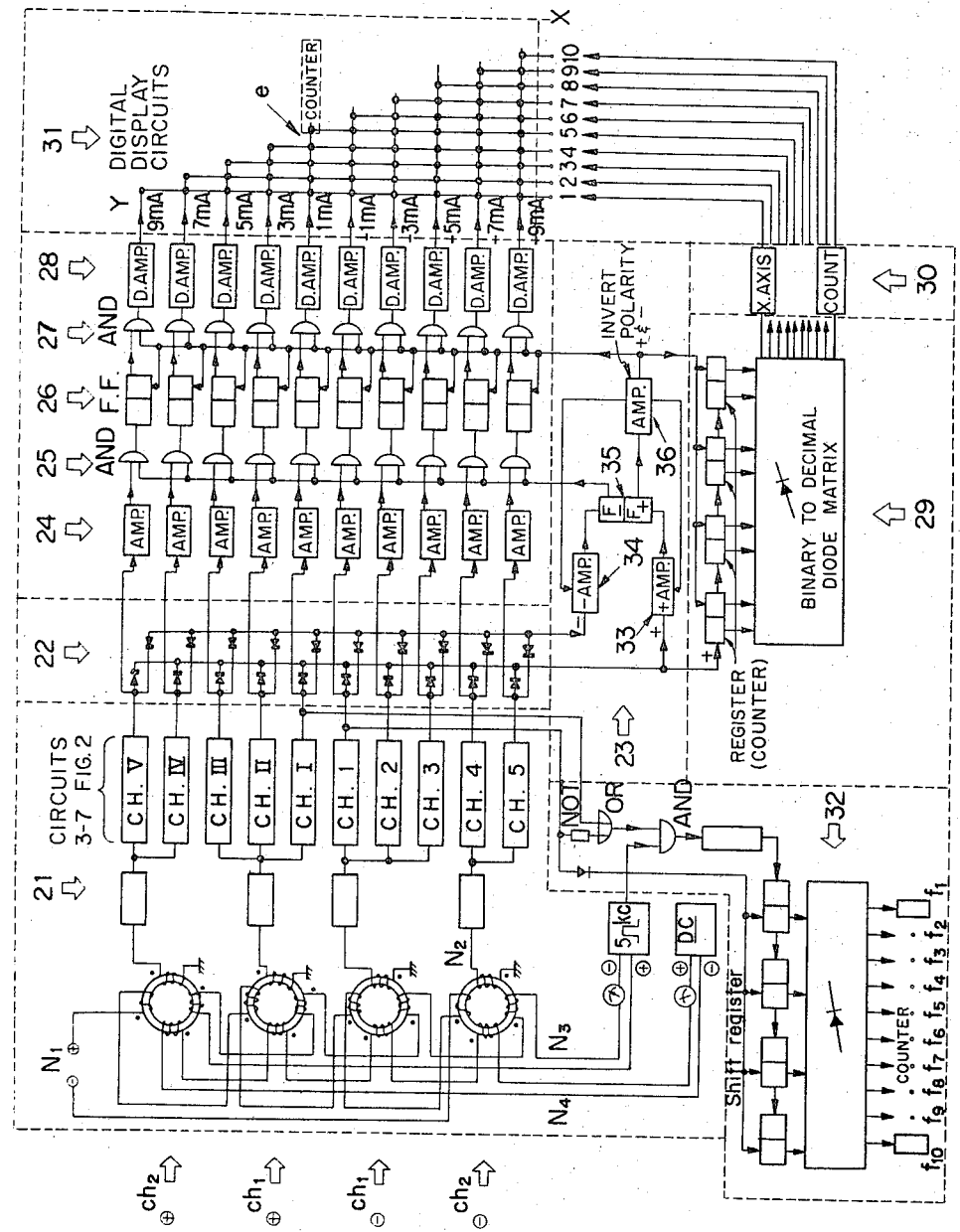

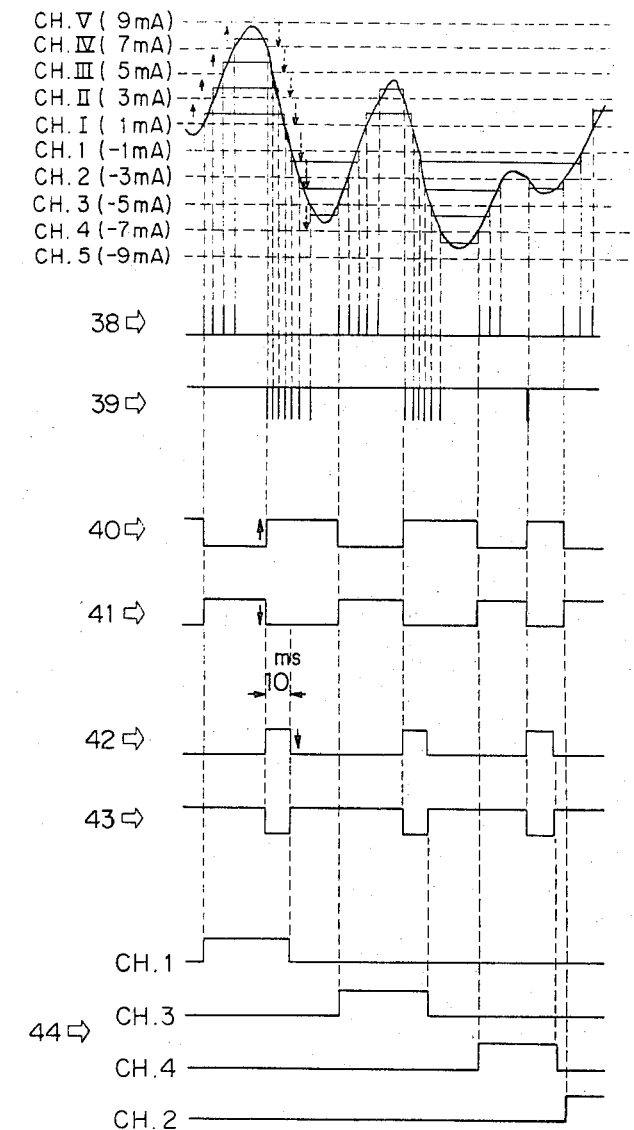

United States Patent Office 3,422,349
Patented Jan. 21, 1969

3,422,349
METHOD AND DEVICE FOR DIGITAL, MULTI-FACTOR WAVEFORM ANALYSIS OF VARIABLE STRESS
Takayuki Makino, Okazaki, Japan, assignor to Toyota Jidosha Kogyo Kabushiki Kaisha, Toyota-shi, Aichi-ken, Japan, a corporation of Japan
Filed June 9, 1966, Ser. No. 556,311
Claims priority, application Japan, June 9, 1965, 41/1,660, 40/34,566
U.S. Cl. 324—77                 9 Claims
Int. Cl. G01r 23/16; G01r 27/02; H04m 1/24

This invention relates to a method of digital analysis of a variable waveform for simultaneous, multi-factor evaluation of the amplitude of variable stress, average stress and frequency components, for predicting the fatigue life of a material under random stress and to the apparatus for determining said method.

In the prediction of the fatigue life of a member under random stress by means of Miner's rule of linear cumulative damage (M. A. Miner: Trans. of ASME, vol. 67, 1945, A-159, The Linear Cumulative Damage Rule) a more reasonable estimation of actual service life of the member can be made, by analysis of the variable stress wave form by considering the amplitude of superposed wave components and frequency occurrence distribution.

This invention provides the teaching for determining the various components required in using Miner's rule. For example, the actual stress in the suspension spring of a vehicle member permits a stress measurement and by using the teaching of the invention, the data obtained are sorted into maximum-minimum values (peak to peak values), average values and frequency components, and the results are analyzed by Miner's Linear Cumulative Damage Rule, thereby determining the extent of fatigue damage inflicted to the member per unit distance and applying the result as a measure of road surface evaluation for life prediction.

The digital multi-factor waveform analysis and processing method and device described herein are found very effective, because they enable simultaneous execution of both multi-factor amplitude sorting and frequency analysis of a variable stress waveform. Since the obtained data can lead directly to the expected life of the product, the product quality and reliability can be increased.

This device will be particularly applicable for various vibration analyses of vehicle performance or running conditions.

This invention utilizes the memory characteristics and the rectangular hysteresis characteristics of a high-permeability magnetic core in a digital waveform conversion circuit that converts a variable stress waveform to a pulse signal which attains a set level or magnitude, the circuit being combined with a waveform analysis display circuit composed of a logic, a memory and a counter circuit, thereby making it possible to determine simultaneously the maximum-minimum values, average values and frequency components of a variable stress waveform as digital quantities.

It is therefore a general object of this invention to convert a variable stress waveform to a pulse signal that attains a set level or magnitude.

It is another object of this invention to provide a waveform analysis and display method that will produce a simultaneous display in digital quantities of the maximum-minimum values, average values and frequency components of a digitally converted variable stress waveform.

It is a further object of this invention to provide apparatus capable of making a simultaneous display in digital quantities of the maximum-minimum values, average values and frequency components of variable stress waveform.

A still further object of this invention is to provide a method of analysis of variable stress that will produce a simultaneous evaluation of the maximum-minimum values, average values and frequency components of variable stress, in the form of a three-way stress display in digital quantities.

Another object of this invention is to provide a stress-cycle counter in the form of a display device displaying variable stress as a result of digital waveform analysis.

These objects and features will now be described with reference to the accompanying drawings, in which:

FIG. 1 shows a typical variable stress waveform and evaluation thereof;

FIG. 2 schematically shows an electric circuit for waveform conversion and digital processing of an input waveform;

FIG. 3 diagrammatically shows the position of the exciting pulse and the bias magnetic field on the hysteresis curve of a high permeability magnetic core having square characteristics;

FIG. 4 diagrammatically shows the change in the magnetic field when the AC current is passed through the input winding of a square core;

FIG. 5 diagrammatically shows the steps of the waveform change in the waveform conversion and digital processing circuit;

FIG. 6 is a simplified diagram of the waveform analysis and the digital display method;

FIG. 7 is a schematic diagram which illustrates an example of the application of this invention having a three-way stress cycle counter;

FIG. 8 illustrates the steps of the waveform analysis and the wave shapes developed for actuating the logic counter circuit;

The following is a detailed account of this invention referring to the attached drawings.

Figure 1:
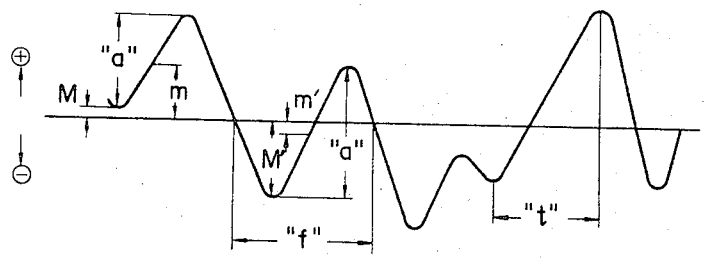

FIG. 1 shows a typical variable stress waveform and relates the designations used for evaluating the waveform. It will be noted that a reference line is established, above which the wave is a positive going wave and below which is a negative going wave. Peak to peak values or maximum-minimum values $a$ are illustrated and the initial values or magnitudes are designated M and M'. The frequency of a typical wave is shown for one cycle and the period $t$ designates that portion of time between peak to peak values. The average amplitude or value in the positive going direction is designated $m$ and is obtained from the formula $m=M+a/2$ and in like manner, the negative going average value $m$ is obtained from the formula $m'=-M'+a/2$.

Figure 2:
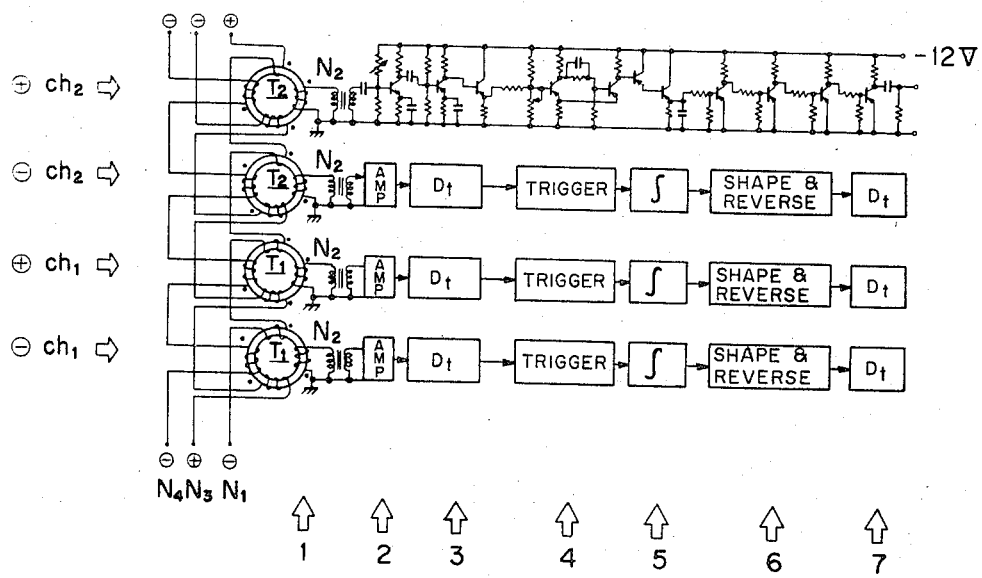

FIG. 2 shows the digital waveform conversion circuit that converts the variable stress waveform to a pulse signal that attains a set level or magnitude, the circuit comprising an input waveform conversion circuit utilizing a high permeability magnetic core and a circuit for digitally processing the waveform. As shown generally in FIG. 2, the high permeability core 1 has an exciting circuit and an output winding the latter of which is connected to a saturation amlifying circuit 2. That is, the amplifying circuit is saturated in only one direction. The output of the amplifying circuit is connected to a differentiation circuit 3, which is used to provide signals for a Schmidt trigger circuit 4. The output of the Schmidt trigger circuit is applied to an integration circuit 5, the integrated signal being used to drive a shaping and polarity-reversing circuit 6 which in turn is applied to a differentiation circuit 7. It will be noted that the circuit just described is used for positive going channels 1 and 2 and for negative going channels 1 and 2.

The high permeability core 1 has an input winding $N_1$, a readout winding $N_2$, and exciting pulse winding $N_3$ and an exciting bias winding $N_4$. An input current having a wave shape equivalent to the variable stress is applied to winding $N_1$, an exciting pulse current is applied to winding $N_3$ and a direct current for generating a bias magnetic field is applied to winding $N_4$. The output current wave shape is taken across winding $N_2$.

A number of turns $N_1$ of transformers $T_1$ and $T_2$ respectively for positive channel $+CH_1$ and negative channel $-CH_1$ is chosen to give a higher amplitude output than the number of turns of winding $N_1$ on transformers $T_1$ and $T_2$ used for positive channels $+CH_2$ and negative channel $-CH_2$. The amplitude divisional level is thus set by the transformer turns. The rectangular pulse for which the input current wave form has been sampled by the exciting pulse to read out on winding $N_2$ of the appropriate channel which of course depends upon the relative amplitude or magnitude of the input current. It will also been seen in FIG. 2 that in order to properly identify the polarity of the input waveform, the direction of the windings of turns $N_1$, $N_2$, $N_3$ and $N_4$ are all indicated by a polarity dot, it being seen that those of positive polarity are wound in one manner and those of negative polarity are wound in the opposite manner. Therefore, depending on the relative magnitude and polarity of the input current waveform, any one of the four channels may be actuated. A number of magnetic cores is appropriately chosen by considering the required number of divided amplitude levels for which the signals are to be divided and for the embodiment shown and described herein, the positive and negative going amplitudes are divided into two levels, thus requiring four magnetic cores having square hystereses characteristics. The input signals are created by the use of a strain gauge or strain meter which has a relatively low impedance and is substantially matched to the impedance of the input winding $N_1$ of each of the cores. Through this means, the variable stress is measured and the signal applied to the input windings. The input current for this particular embodiment varies in the range of zero to fifteen milliamperes having a frequency range of zero to fifty cycles per second. This signal is impressed upon the magnetic cores which have good rectangularity since the better the rectangularity, the more sensitive the core is to a slight change in the input current and accordingly the digital circuit can be designed with greater ease and with higher accuracy and sensitivity. It has been found that where the magnetic cores having the following characteristics, they have been quite acceptable.

Dimensions:
    Outer diameter _____ mm__ 6.0
    Inner diameter _____ mm__ 4.5
    Height _____ mm__ 10.0
Plate thickness _____ mm__ 0.006
Number of turn layers _____ mm__ 35
Magnetic characteristics:
    Rectangularity _____ percent__ 95
    Coercive force _____ Oe__ 0.21

Winding specification:
    (1) $(+)ch_1$, $(-)ch_1$—20T($N_1$), 30T($N_2$), 10T($N_3$, $N_4$)
    (2) $(+)ch_2$, $(-)ch_2$—10T($N_1$), 20T($N_2$), 10T($N_3$, $N_4$)

Exciting current:
    (1) Exciting pulse current, 5 kc., 100 ma.
    (2) Exciting bias current, 60 ma. D.C.

Figure 3:
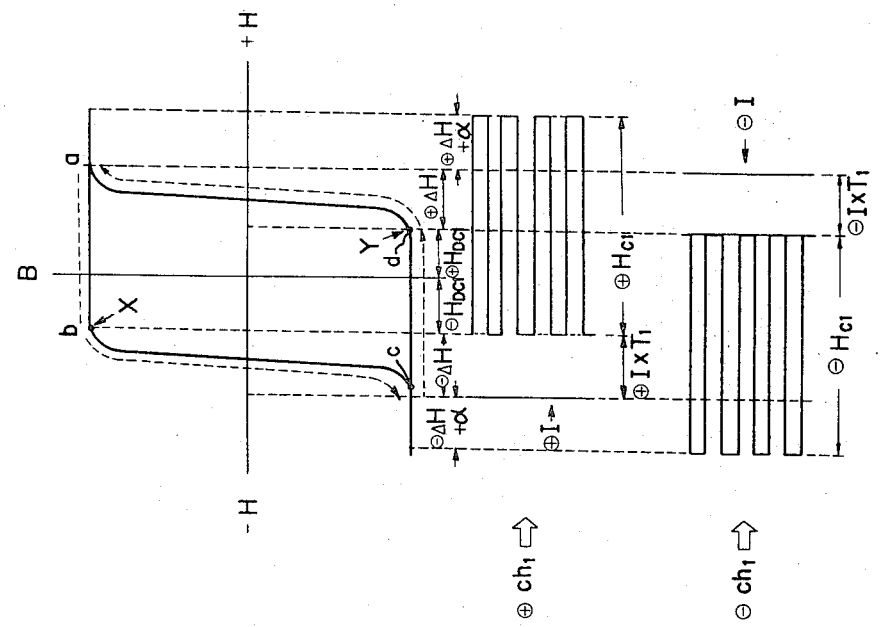

The principle of operation of the magnetic core having a characteristic square hysteresis curve is shown in FIG. 3 where the exciting pulse magnetic field and the bias magnetic field are shown with respect to their operating points. The exciting pulse magnetic fields (positive or negative) are shown superimposed about their operating points and and are designated respectively $(+)H_{c1}$ and $(-)H_{c1}$. The bias magnetic fields are designated $(-)H_{Dc1}$ and $(+)H_{Dc1}$.

The change in field intensity $(-)\Delta H$ and $(+)\Delta H$ are the product of input current $(+)I$ and $(-)I$ and the number of turns $T_1$ and $T_2$ in the input winding. There is a limit $\alpha$ indicating the shifting limits of the exciting bias magnetic field, the limit being determined so that the initial magnetic stability point X may move along the hysteresis curve with stability under all conditions such as when the changes in flux density H are generated in opposite directions to the exciting pulse magnetic field. The limit $\alpha$ is then determined taking into consideration the magnetic field created by the maximum input current.

Figure 5:
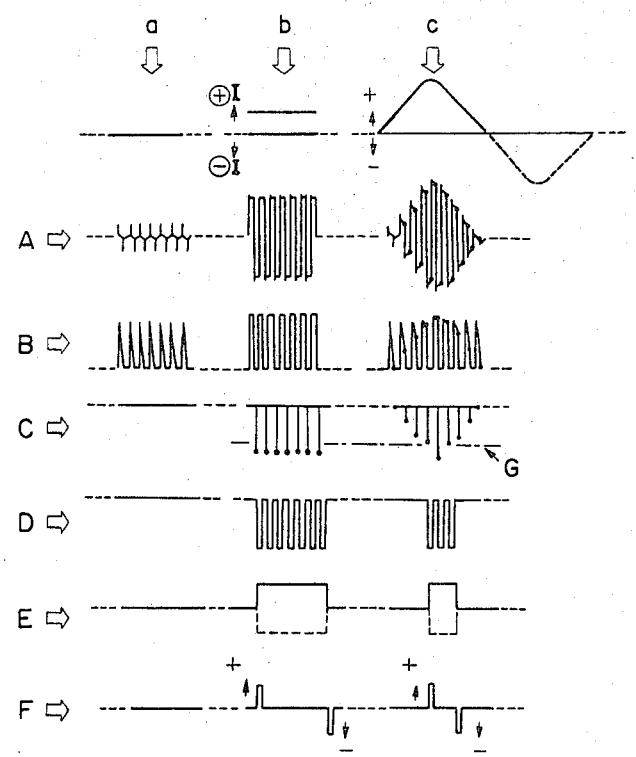

During the time when no current flows in the input winding to the magnetic core, the initial magnetic stability points X and Y operate respectively between points $a$ and $b$ and $c$ and $d$ on the hysterisis curve and the result is that there is only a small change in magnetic flux and as a consequence, a very small voltage of pulse-like form is generated from the respective read out windings and such a pulse is shown in FIG. 5, column $a$, and row A.

Describing the operation of the magnetic core as found, in channel $(+)ch_1$ (FIG. 2) when a direct current is applied to the input winding in the same direction as the mangetic field, the point X will shift from $b$ to $c$ to $d$ to $a$ on the hysteresis curve if the magnetic field $(+)IT_1$ created by the product of the number turns in the input winding and the input current is equal to the negative going change in magnetic intensity $(-)\Delta H$. Accordingly, the read out winding will generate a rectangular voltage wave as shown in FIG. 5, column $b$, and row A. That is, this wave shape will be produced as the result of sampling the specified direct current by the exciting pulse having a 5 kc. frequency. Thus as the magnetic field in the magnetic core of channel $(-)ch_1$ shifts in the direction from $d$ to $c$, the initial magnetic stability point Y will only move back and forth over the points from $d$ to $c$ and the read out winding will generate a signal such as that shown in FIG. 5, column $a$, row A. Also, when the negative current $(-)I$ is applied to the input winding, the operating point Y shifts from $d$ to $a$ to $b$ to $c$ and back to $d$ and the read out winding of the core of channel $(-)ch_1$ will generate a definite rectangular voltage wave shape.

It will also be remembered that the number of turns $T_2$ in the input windings of the magnetic cores of channels $(+)ch_2$, and $(-)ch_2$, is made less than the number of turns $T_1$ in the input windings of the cores of channels $(+)ch_1$ and $(-)ch_2$, the magnetic fields thus created by the input current will be smaller and where the number of turns $T_2$ in the input winding is matched to the required division level, a voltage of rectangular wave shape will be produced from the read out winding of the cores of channels $(+)ch_2$ and $(-)ch_2$ in accordance with the amplitude of the input current.

Figure 4:
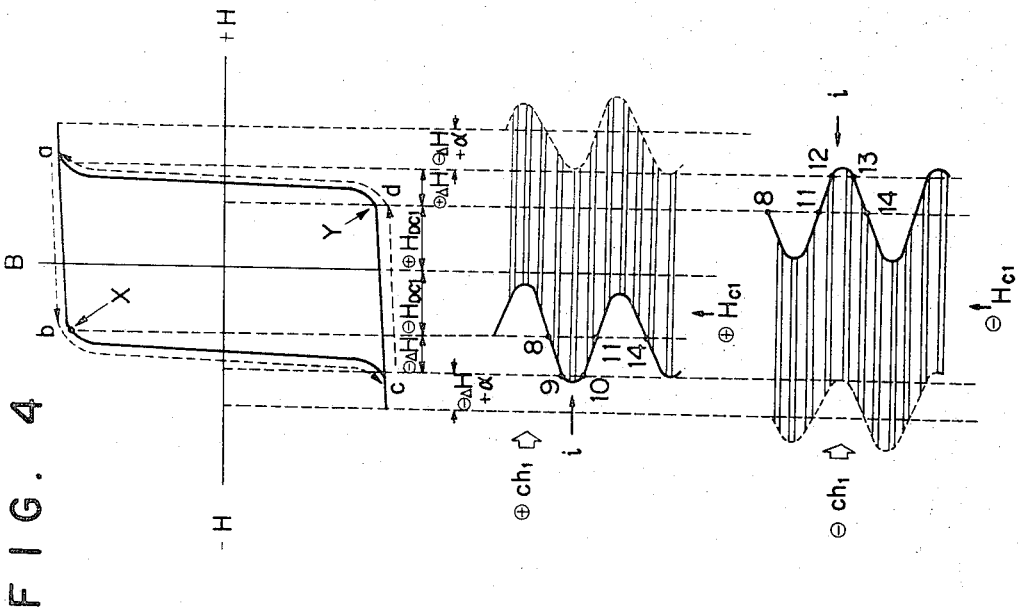

FIG. 4 illustrates the change in the magnetic field when an alternating current is passed through the input winding, the symbols thereon denoting the same quantities as found in FIG. 3. When an alternating current I is applied to the input winding, a voltage having a rectangular wave shape as shown in FIG. 5, column $c$, row A, appears at the read out winding of the magnetic core of the positive channel $(+)ch_1$ for a positive going direction change from points 8 to 9 to 10 and to 11 of the alternating current. Since the hysteresis curve is linear between points $b$ and $c$, the output waveform will follow the input waveform during the sampling time of the exciting pulse so that the waveform obtained is like that of FIG. 5, column $c$, row A. In other words, the magnitude or level of the input waveform operates as a factor in determining the output waveform. Similarly, for a negative going direction change such as found in negative channel 1 $(-)ch_1$ an input waveform having points 11, 12, 13, and 14 will produce a waveform like that of FIG. 5, colum $c$, and row A. The action of the magnetic cores of channels $(+)ch_2$ and $(-)ch_2$ is the same as when a direct current is passed through the input winding since the cores produce a larger amplitude than those of channels $(+)ch_1$ and $(-)ch_1$.

As described previously, the circuit No. 1 shown in FIG. 2, is an input waveform conversion circuit utilizing the exciting pulse, the core memory and the rectangular hysteresis characteristics for reading out in digital quantities the maximum-minimum values or peak to peak values, and the average values of the input waveform.

The circuits, numbered 2 through 7 in FIG. 2, digitally treat the exciting pulse—sampled waveform obtained from the input waveform circuit No. 1. The waveforms of FIG. 5 respectively show as inputs at columns $a$, $b$, $c$, wave shapes where in column $a$ there is no input wave shape, in column $b$ there is a positive direct current input, and in column $c$ there is a sine wave. These input wave shapes would be applied to input winding $N_1$ and as the input wave is treated by the different stages of circuits that follow, certain waveforms are found. The waveforms present in each of circuits 1 through 7 of FIG. 2 for the given input waveforms just described are shown for the following designated rows.

FIG. 5 row:              FIG. 2 circuit No.
A _____ No. 1 exciting circuit.
B _____ No. 2 saturating type amplifier circuit.
C _____ No. 3 differentiation circuit.
D _____ No. 4 Schmidt trigger circuit.
E _____ No. 5 and No. 6 integration circuit, shaping and polarity reversing circuit.
F _____ No. 7 differentiation circuit.

In describing the wave shapes of FIG. 5, it will be seen that when there is no input signal or current flow in the input winding $N_1$ of FIG. 2, such as shown for column $a$, there is a very small change in the mangetic flux of the magnetic core and accordingly a minute voltage wave corresponding to the exciting pulse will appear at the read out winding $N_2$ of FIG. 2 and as shown in column $a$, row A of FIG. 5. Applying a current waveform of this nature to the saturation amplifying circuit 2 of FIG. 2, which amplifies the signals in only one direction, results in the production of a wave shape such as shown in FIG. 5, column $a$, row B. Applying this signal to the differentiation circuit 3 of FIG. 2, produces no voltage output because of the peaked nature of the wave from the saturation amplifier and thus there is no voltage generated and this is shown graphically in FIG. 5, column $a$ row C. Since there is no output voltage from the differentiating circuit, there will be no voltage change at any part of the circuit following the differentiation circuit and this is also illustrated in FIG. 5, column $a$, rows D, E, and F.

Taking the case of a direct current flow of positive magnitude in the input winding $N_1$ of FIG. 2, there is produced wave shapes such as found in FIG. 5, column $b$. There is a rapid change in the magnetic flux of the magnetic cores of channels $(+)ch_1$ and $(+)ch_2$, depending on the amplitude of the direct current and as the result thereof, there is produced a voltage of rectangular wave shape such as found in row A of FIG. 5. That is, the direct current input voltage as sampled by the exciting pulse will be read out on the read out winding. Passing this waveform to the saturation amplifier 2 of FIG. 2 produces an output wave such as found in row B and after being differentiated by the differentiation circuit of FIG. 2, a differentiated waveform of constant amplitude is developed such as shown in row C. Upon being applied to the Schmidt trigger circuit 4 of FIG. 2, the differentiated waveform will assume the shape of a number of square waves triggered by the differentiated spiked wave shapes such as found in row D. Of course the Schmidt trigger circuit may be set for any amplitude divisional level at which it will fire and thus a fine control of the amplitude division level may be achieved. The signal from the Schmidt trigger circuit when applied to the integration circuit 5 and the wave shaping and polarity reversing circuit 6 of FIG. 2, produces the envelope of the exciting pulse group in reverse polarity such as found in row E and as long as the amplitude of the direct current input signal exceeds the divisional level of the Schmidt trigger circuit, an isolated pulse of constant amplitude will be obtained. To determine when the square wave of the integration circuit is present, the pulse is applied to another differentiation circuit 7 of FIG. 2 so that differentiated pulses of positive and negative going direction as shown in row F will be generated, the positive going pulses indicating the square wave presence and the negative going square wave indicating the absence of the square wave.

It will also be recognized that when a direct current of negative magnitude is applied to the input of channels $(-)ch_1$ and $(-)ch_2$, the pulse wave shape will be of reverse direction to the waveform shown in rows E and F.

When an alternating current is applied to the input winding of the magnetic cores such as shown in column $c$ of FIG. 5, the resulting voltage waveforms are shown in rows A through F. Applying an alternating current to the input winding will produce a sudden change in the magnetic flux of the magnetic cores of channels $(+)ch_1$ and $(+)ch_2$ for a change in a positive direction and the read out wave shape will appear like that in row A due to the exciting pulse and thus the output waveform appears similar to the exciting pulse, the magnitude of which varies with the amplitude of the input waveform. Applying this voltage to the saturation amplifier produces a wave shape like that found in row B. When this wave shape is applied to the differentiation circuit, and ultimately passed to the Schmidt trigger circuit, as long as the amplitude of the input wave shape exceeds the amplitude divisional level set by the number of turns in the input winding $N_1$ and the trigger level voltage G of the Schmidt trigger circuit (FIG. 5, row C) the pulses as found in rows E and F will be generated. With a negative going direction change of alternating current, channels $(-)ch_1$ and $(-)ch_2$ will successively act depending on the amplitude of the input current. It will also be seen that some rearrangement of the circuit of FIG. 2 will produce the same results. For instance, the exciting pulse sampled input waveform as obtained from the differentiation circuit 3 is reproduced in the integration circuit 5. That is, if the Schmidt trigger circuit is actuated by this integrated waveform, an isolated pulse may be obtained directly. Therefore, a circuit in which the differentiation circuit 3 is followed by the integration circuit 5, the Schmidt trigger circuit 4, and the shaping and polarity reversing circuit 6 followed by the differentiation circuit 7 will give the same result.

Turning now to FIG. 6 a method of digital multi-factor analysis and display for an input waveform utilizing the method and apparatus described herein will be explained. By using the isolated pulses such as appeared on row E of FIG. 5 and the differentiated pulses which appeared on row F of FIG. 5, analyzing the wave shape of FIG. 6 and how the circuit acts upon the wave shape will be apparent. In FIG. 6, numerals 15, 16 and 17 represent the pulse waveforms generated by positive channels $(+)ch_1$ and $(+)ch_2$ and numbers 18, 19 and 20 represent the pulse waves generated by negative channels $(-)ch_1$ and $(-)ch_2$. An initial value or magnitude detection memory circuit M and counter circuit R are shown and will be explained in more detail later. The output terminal of each channel is connected to a Y axis and the positive going differentiated pulses representing peak to peak values are connected to an X axis, thereby constituting a counter-matrix and at the intersection of these axes, a counter is connected. Three counters, labeled $a$, $b$, and $c$ make up a digital display of peak to peak values of the input waveform with the initial value as the starting perimeter. As each counter displays its peak to peak values and the average values are obtained from the initial values, the counter readings will directly give the peak to peak values and average values of the input waveform.

By utilizing the exciting pulse or a separately provided reference pulse for the counting circuits, the results of each count of the pulse width of the isolated pulses such as pulses 15 and 18 of FIG. 6 are applied to the counter which is chosen to properly present the particular frequency range involved, and the frequency analysis of the input waveform will be determined by reading the counters. This of course is possible where the amplitude division level of positive and negative channels $(+)ch_1$ and $(-)ch_1$ respectively are set as low as possible. Also, the generating period of the differentiated pulse (the period of peak to peak values $t$) of positive going direction and that of the differentiated pulse of negative going direction, may be determined. For example, between 20 and 20' of FIG. 6 the counts obtained are fed to the counters, and the period is obtainable. Thus the superposed wave components contained in the variable waveform may be analyzed from the counter readings.

By way of illustration, an actual application of the above mentioned digital waveform conversion, analysis and method will be set forth where a three way stress cycle counter will be described and reference made particularly to FIGS. 7 and 8. In this particular cycle counter, in which the amplitude of variable stress is split into ten divisions in two milliampere units, the stress amplitude, the average stress, and the frequency components thereof can all be approximated simultaneously. FIG. 7 is a block diagram of the three way stress analysis cycle counter, that part being labeled 21 conforming to the waveform conversion and pulse treating circuit of FIG. 2 for digital treatment of the variable stress waveform. The circuit has four input channels as described previously and the saturation amplifying circuit of FIG. 2 is followed by ten channels (CH1 through CH5 and CH-I through CH-V) of the circuits numbered 3 through 7 of FIG. 2, so that the variable stress may be divided into ten divisions according to polarity amplitude. By using a circuit of this nature, the number of magnetic cores may be reduced to four instead of using ten magnetic cores matching the number of required amplitude divisions. After rough sorting of the variable stress amplitudes by polarity in the four cores, the waveform such as found in FIG. 5, row C, is divided into ten levels with extreme accuracy by varying the trigger level of the Schmitt trigger circuit. A circuit 22 made up of diodes which are properly oriented, serves to sort the pulses such as pulses 16, 17, 19 and 20 of FIG. 6 into positive and negative going pulses as they emerge from the ten channels. Circuit 23 is a circuit serving to generate control signals for detecting, storing or reading out the initial values or for resetting the counter circuits. Circuit 33 is a circuit serving to amplify the positive going direction pulses only. Circuit 34 is a circuit serving to amplify negative going direction pulses only. Circuit 35 is a standard flip-flop circuit for control purposes and circuit 36 is a circuit for generating the read out and reset signals. Circuit 24 is a differentiation amplifying circuit, which is used to drive an AND gate circuit 25, the output of which drives another flip-flop circuit 26 which is used for detecting and storing the initial values and the flip-flop signal is used to drive another AND gate circuit 27, the output of which is applied to a counter drive circuit 28. The circuits just described are used for driving the Y axis counter as well as detecting and storing the initial values of the input wave. Circuit 29 includes a register for counting and storing the peak to peak values and includes a binary-to-decimal diode matrix circuit. An X axis counter drive circuit 30 is connected to the binary-to-decimal diode matrix 29. A circuit 31 comprises a circuit for digitally displaying the results of the variable stress waveform treatment and is arranged as a counter matrix where the X axis supplies the peak to peak values and the Y axis supplies the initial values, a counter being connected at each of the X-Y intersections to display the waveform components of the variable stress waveform. For the example shown in FIG. 7, there would be 55 counters connected at the intersection of the X-Y axes. Therefore, the 55 counters will display the values averaging the peak to peak values and the initial values so that the amplitude change frequencies of variable stress can be sorted out according to the peak to peak values and the average values from the counter readings.

FIG. 8 explains the method of analyzing the waveform of variable stress where numeral 37 refers to the ten different channels and shows the two milliampere breakdown or divisional level between channels above and below a given reference point. When the variable stress waveform reaches an amplitude or magnitude equal to a trigger circuit divisional level, the positive going direction pulse as represented by the solid line arrow is generated in the case of a rising waveform and a negative going direction pulse as represented by the dotted line arrow is generated in the case of a decreasing waveform. The positive and negative going direction pulses are sorted out respectively by the circuit 22 of FIG. 7 and turned into series signals such as found in FIG. 8, the signals appearing on lines 38 and 39. When the series positive oriented pulse signals of line 38 (FIG. 8) are applied to the peak to peak value counter circuit 29 of FIG. 7, the X axis will count 1, 2, 3, and 4 of every arrival of a positive oriented pulse. Thereby, with the X axis and Y axis being connected in series through the counter, the counter will not be driven while the Y axis is in-active and thus the X axis which records the peak to peak values will memorize the position at which the positive going pulses cease to appear, until the Y axis is actuated. For instance, if there are four positive going pulses, the position 4 on the X axis will be memorized. At the same time, circuits 24 through 27 of FIG. 7 for detecting and storing the initial values will pick up the initially generated positive direction pulses from the channel corresponding to that particular generating level and store it. For instance, where the first positive going direction pulse has been generated in channel CH-I, it will be stored by the flip-flop circuit 26 of channel CH-I in FIG. 7 and this condition is illustrated as that found in FIG. 8 and designated reference numeral 44.

When the first negative going direction pulse arrives (such as seen in line 39) the first negative direction going pulse will actuate amplifier circuit 34 and flip-flop 35 of FIG. 7 and at the same time amplifier circuit 36 will generate a read out signal with a ten millisecond width as shown in line 42 of FIG. 8. Simultaneously with the generation of the read out signal, the Y axis will be driven through the AND gate 27 of FIG. 7. Of course the counter drive time must be taken into consideration when determining the pulse width of the read out signal. With the positive direction pulse counted and stored by the X axis, the read out signal will actuate the X-Y counter matrix and results of the waveform analysis will be displayed by the counter connected to the X-Y intersection. For example, in the case of the initial rise waveform designated numeral 37 of FIG. 8, with the peak to peak value being four and the initial value being one milliampere at channel CH-I, the counter $e$ of the digital display circuit 31 will be actuated and since the counter displays the average three milliamperes obtained from the initial value of one milliampere plus four milliamperes representing the peak to peak value divided by two, the average is three milliamperes and the variable stress waveform can be read in terms of the peak to peak and average values. Immediately after the counter is driven by the read out signal with a ten millisecond pulse width, the downwardly sloping side of the read out signal as indicated by the arrow in line 42 of FIG. 8 is differentiated to generate the negative going pulse which is used to reset the stored X–Y axis value and restore the original condition.

The output of the control flip-flop circuit 35 of FIG. 7 produces a pair of waveforms such as found in lines 40 and 41 of FIG. 8, the former being applied to the AND gate 25 and the latter signal is applied to the input terminal of the signal generating circuit 36. Once the negative going spike pulse such as found in line 39, arrives at amplifier 34, flip-flop 35 is actuated causing one of the AND gates 25 of FIG. 7 to conduct and actuate it for detecting and storing the initial positive going direction pulse. This will have caused the two voltage wave shapes on line 40 and 41 of FIG. 8 to change direction and as a result, the read out signal generating circuit 36 of FIG. 7 can be operated by differentiating the square wave appearing on line 42 and utilizing the differentiated wave.

The waveform as found in line 43 of FIG. 8 is an inversion of the read out signal from amplifier 36 and this serves as a signal to prevent an ambiguous or false action during the read out period. Through repetition of the above actions, the variable stress can be sorted out into peak to peak values and average values and the results will be displayed on the counters. Thus the amplitude change frequency of variable stress waveforms may be evaluated in terms of peak to peak values and average values from the counter readings.

The frequency range of the cycle counter just described depends primarily on the frequency characteristics of the magnetic cores employed and is sufficient for a variable stress change of up to 100 cycles per second where the frequency of the exciting pulse is 5 kilocycles per second.

At the same time, the two isolated pulses successively generated from the lowest amplitude division level of channels CH–I and CH–1 are applied to a circuit 32 of FIG. 7 which includes a shift register and counters designated $F_1$ through $F_{10}$. The pulse widths of the isolated pulses appearing at the two channels just mentioned are counted and added by the counters so that the frequency band may be analyzed. In other words, the wider the pulse the lower the frequency and thus the band may be broken up into components and the frequency analysis of the variable stress made simultaneously from the counter readings.

Figures 9A, 9B:
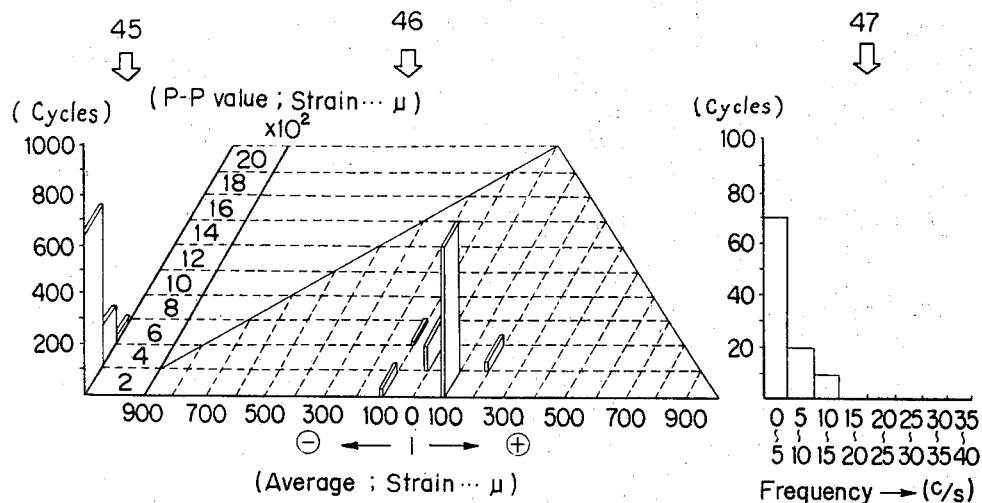
FIGS. 9a through 9d illustrate examples of the results of measuring the stress frequency in automotive members by means of the present invention having a three-way stress cycle counter.
Figures 9C, 9D:
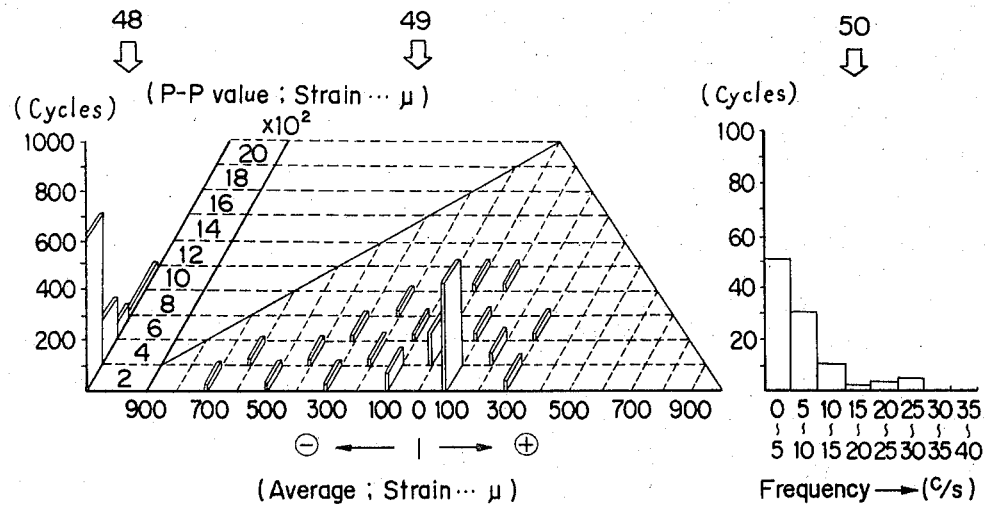

FIG. 9a through 9d are graphs presenting data obtained to measurement of actual stress in the rear-axle housing of the vehicle under running conditions as carried out using the three-wave stress cycle counters numerically shown in FIG. 7 while the apparatus is mounted on a vehicle. The data displayed in FIGS. 9a and 9b is the result of actual stress measurements made of a vehicle having a speed of 20 kilometers per hour. The numeral 45 represents the stress occurrence frequency as determined in terms of maximum-minimum values or peak to peak values of strain alone while the numeral 46 represents the peak to peak values and average values of stress as a function of the strain. FIG. 9b, as designated by numeral 47, shows the respective frequency occurrence distributions as a function of the frequency from zero to 40 cycles per second. In a similar manner, FIGS. 9c and 9d are graphical illustrations of a similar treatment of stress measurement data for a vehicle speed of 50 kilometers per hour. It will thus be observed that there is hardly any difference in the occurrence distribution of actual waveform amplitude whether taken at 20 kilometers per hour or at 50 kilometers per hour at evidenced by the values obtained and designated by numeral 48 in FIG. 9c. However, there is shown the results of a two way analysis and display using peak to peak values and average values when the values are compared such as designated by numeral 46 and numeral 49. A comparison may also be made between the occurrence of pulses detected at the frequencies between zero and 40 cycles per second by comparing FIGS. 9b and 9d.

It is understood that the present disclosure has been made only by way of example and that any modifications and changes in various details may be possible without departing from the scope of the invention as hereinafter claimed.

I claim:

1. The method of electrically analyzing a variable stress waveform obtained by a strain gauge sensor connected to a signal conversion device having different signal amplitude levels with its output connected to a polarity sensitive and amplitude level setting circuit, the output of which is applied to a display device through a differentiation circuit, said method comprising the steps of:
   (a) converting a variable stress waveform voltage from an analog waveform to a digital waveform with an envelope like said analog waveform;
   (b) quantifying said signals converted according to the number of amplitude divisions in the signal conversion device;
   (c) differentiating said signals converted from said variable stress waveform;
   (d) limiting the amplitude of each of said differentiated signals to a set voltage and rejecting all signals having an amplitude less than set voltage;
   (e) converting each of said differentiated signals having a magnitude of said set voltage to isolated pulse signals to provide signals having a width representative of a certain amplitude level;
   (f) differentiating said isolated pulse signals to provide polarity sensitive direction signals;
   (g) combining said isolated pulse signals and said differentiated pulse signals to provide driving voltages for a display and multi-factor analysis of said variable stress waveform.

2. The method of electrically analyzing a variable stress waveform by superposing direct current and pulse signals and quantifying them to provide driving voltages for a display and multi-factor analysis of the variable stress waveform, said method comprising the steps of
   (a) generating a plurality of signals representative of a variable stress waevform according to polarity and amplitude;
   (b) superposing all signals of like polarity by quantifying said signals;
   (c) converting the quantified signals into a plurality of rectangular sampling voltages;
   (d) differentiating said sampling voltages;
   (e) limiting the amplitude of said differentiated sampling voltages to set voltages and rejecting all signals having an amplitude less than said set voltages;
   (f) converting each of said limited differentiated sampling voltages to isolated pulse signals to provide signals having a magnitude equal to said set voltages and of the same polarity;
   (g) differentiating said isolated pulse signals to provide polarity sensitive direction signals;
   (h) counting said differentiated isolated pulses to provide peak to peak values of said variable stress waveform;
   (i) and combining said isolated pulse signals and said differentiated isolated pulses to provide average values of said variable stress waveform.

3. The invention as set forth in claim 2 including:
   (j) generating reference pulses for a time base;
   (k) determining the elapsed time for the pulse widths of two isolated pulses generated from the lowest amplitude division level of opposite polarity;
   (l) dividing the time required for each pulse of each polarity by the time elapsing between reference pulses to provide a measurement of frequency for each such isolated pulse.

4. Apparatus for analyzing the variable stress of a member and providing a digital display, said apparatus comprising:
(a) a variable stress sensor adapted to be secured to a member to be analyzed, said sensor developing a variable stress electrical waveform;
(b) a signal conversion device connected to said sensor having square magnetic hysteresis properties, said device being constructed and arranged to produce digital output signals representative of the signal produced by said variable stress sensor;
(c) a polarity sensitive and amplitude level setting circuit producing output signals when the amplitude of said output signals of said signal conversion device are at least equal to the amplitude of said level setting circuit, each of said output signals having a square envelope waveform of width equal to the width of each of said signals produced by said signal conversion device at the amplitude of said level setting circuit;
(d) a differentiating circuit connected to said level setting circuit for producing voltage wave shapes representative of the derivative of said square waveforms;
(e) a first counter mechanism connected to said differentiation circuit and actuated by said signals therefrom to provide a display of peak to peak values of said variable stress waveform;
(f) and a second counter mechanism connected to said differentiating circuit and said level setting circuit and actuated by said signals therefrom to provide a display of average values of said variable stress waveform.

5. The invention as set forth in claim 4 wherein:
(g) said signal conversion device induces a plurality of channels connected in parallel, each of said channels being distinct from the other and having a predetermined operating level.

6. The invention as set forth in claim 5 wherein:
(h) said signal conversion device includes a plurality of magnetic cores, each having input and output windings and bias and excitation circuits connected thereto, said bias circuit including a direct current source and said excitation circuit including a signal generating source having a frequency at least 50 times higher than the highest frequency of variable waveform change.

7. The invention as set forth in claim 4 including:
(i) a third counter mechanism;

(j) said level setting circuit having at least two stages of opposite polarity, said third counter mechanism being connected to the two stages of lowest amplitude division;
(k) and a reference signal generator producing reference pulses connected to said third counter mechanism to provide a time base for said third counter mechanism so that the frequency of the variable stress waveform may be determined.

8. The invention as set forth in claim 4 wherein said first counter mechanism includes:
(l) a series signal summing device for summing the signals from said differentiation device;
(m) a control signal generator actuated by the signals from said series summing device and producing output signals therefrom;
(n) a memory register connected to said control signal generator and actuated by the signals therefrom to produce a binary signal output;
(o) a binary to decimal converter for converting signals of binary base to signals of a decimal base;
(p) and a counting device connected to, and driven by, said binary to decimal converter to display the peak to peak values of the variable stress waveform.

9. The invention as set forth in claim 8 wherein said second counter mechanism includes:
(q) a signal storage circuit connected to said series signal summing device for storing each signal from said differentiation circuit;
(r) a gate circuit connected to said signal storage circuit and said control signal generator and actuated by the output signals therefrom;
(s) and a counter driver connected to said counting device to display the average value of the variable stress waveform when there is coincidence of signals from said counter driver and said binary to decimal converter.

References Cited
UNITED STATES PATENTS

| 3,178,582 | 4/1965 | Crane. |
| 3,182,206 | 5/1965 | Waters. |
| 3,360,723 | 12/1967 | Royce. |

RUDOLPH V. ROLINEC, *Primary Examiner.*

P. F. WILLE, *Assistant Examiner.*

U.S. Cl. X.R.

179—1

UNITED STATES PATENT OFFICE
CERTIFICATE OF CORRECTION

Patent No. 3,422,349                                       January 14, 1969

Takayuki Makino

It is certified that error appears in the above identified patent and that said Letters Patent are hereby corrected as shown below:

In the printed specification, sheet 1, upper right-hand corner, "Patented Jan. 21, 1969" should read -- Patented Jan. 14, 1969 --.

Signed and sealed this 21st day of April 1970.

(SEAL)
Attest:

Edward M. Fletcher, Jr.

Attesting Officer

WILLIAM E. SCHUYLER, JR.
                                                        Commissioner of Patents